(12) United States Patent
Ye et al.

(10) Patent No.: US 6,260,363 B1
(45) Date of Patent: Jul. 17, 2001

(54) CONTROL STRATEGY FOR OPERATING AN ON-BOARD VEHICLE REFRIGERATION SYSTEM

(75) Inventors: Liang L. Ye, Auburn Hills; David L. Martin, Bloomfield Hills, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/492,550

(22) Filed: Jan. 27, 2000

(51) Int. Cl.[7] .................................................. F25D 17/06
(52) U.S. Cl. .............................................. 62/89; 62/229
(58) Field of Search .............................. 62/89, 229, 186

(56) References Cited

U.S. PATENT DOCUMENTS

| | | | |
|---|---|---|---|
| 5,027,611 | * | 7/1991 | Doi et al. ............................... 62/158 |
| 5,039,009 | * | 8/1991 | Baldwin et al. ....................... 62/298 |
| 5,197,293 | * | 3/1993 | Okamura et al. .................... 62/228.4 |

* cited by examiner

Primary Examiner—William E. Tapolcal
Assistant Examiner—Mohammad M Ali
(74) Attorney, Agent, or Firm—Roger A. Johnston

(57) ABSTRACT

A temperature sensor is disposed to sense refrigerant temperature discharging from the evaporator of a vehicle air conditioning system. The temperature is averaged over the sampling interval and is inputted to an electronic controller. The controller computes the temperature set points from a lookup table based upon blower speed and blend door settings and cycles the compressor if the averaged temperature is outside the set points.

5 Claims, 3 Drawing Sheets

CONTROL STRATEGY FOR OPERATING AN ON-BOARD VEHICLE REFRIGERATION SYSTEM

BACKGROUND OF THE INVENTION

The present invention relates to refrigeration systems and particularly such systems as employed on board a motor vehicle for providing cooling of a compartment such as the passenger compartment for the vehicle. Currently automotive vehicle passenger compartment air conditioning systems typically employ an engine driven compressor for circulating refrigerant through an exothermic heat exchanger or condenser to an expander for dropping the pressure of the refrigerant for circulation through an endothermic heat exchanger or evaporator located for cooling a flow of air thereover directed to the passenger compartment. The refrigerant is returned to the compressor inlet from the evaporator for recirculation. Typically the compressor is operated by an electrically energized clutch for connecting the compressor to the engine.

Heretofore, such automotive air conditioning systems have proven generally effective; however, the means of controlling the flow of refrigerant to the evaporator for cooling the passenger compartment in the face of varying ambient thermal loading has been accomplished either by utilizing a temperature sensor on the evaporator and using the sensed temperature to control compressor clutch cycling, or by utilizing a pressure sensor in the refrigerant line disposed between the evaporator outlet and the compressor inlet with the pressure switch controlling the compressor clutch. Alternatively, it is known to utilize a temperature sensor in the refrigerant line at the evaporator inlet.

When an automotive A/C system is working under certain conditions, such as higher cooling capacity output (high vehicle speed and engine RPM ), and low cooling load (low blower speed @ recirculation mode or low ambient temperature @ outside air mode), and higher relative humidity of air, the condensate separated from the moist air will freeze on the fins of the evaporator if the condensate temperature reaches 0° C. (32° F.) or below. The frozen condensate will then block the air stream passing through the evaporator, reduce heat transfer effectiveness between the cold refrigerant and the hot air, and will cause the refrigerant system to malfunction, and eventually cause discomfort in the passenger compartment.

In order to prevent condensate freezing on the evaporator and to maintain the normal operation of the air conditioning system, one of the following three different control means has been utilized, namely a system having 1.) a temperature sensor installed in the refrigerant line (cold control); 2.) a pressure transducer installed in the refrigerant line (pressure control); and 3.) a temperature sensor inserted between the fin arrays in the air side of the evaporator (fin sensor control). Each of these system arrangements requires a corresponding control strategy and algorithm to (a) use the temperature or pressure outputs obtained from the temperature sensors or pressure transducer mentioned above as the control parameter(s); (b) use the background information obtained from other subsystems/components ( e.g., blower speed selection, air quality door position, ambient conditions, clutch cycling status, etc. ) through on-board real-time communications; (c) define a set point or operating zone based upon the real-time background information; (d) compare the real-time data input(s) with the defined set point or operating zone and calculate the error(s) between the set point or operating zone and the real-time data input(s); and (e) make control decision and command the desired control action(s).

In systems employing a fin temperature sensor that is inserted among the fin arrays on the evaporator surface, problems have been encountered; namely: 1.) it is very difficult, if not impossible, to define a meaningful sensor location on the evaporator surface. Theoretically, the coldest spot on the surface should be chosen as the sensor location to prevent the evaporator from freeze up. In reality, however, the coldest spot moves randomly around the evaporator surface dependent upon the operating and ambient conditions, as indicated by testing. This uncertainty has resulted in low quality of data inputs, poor accuracy of control, and longer calibration time, and 2.) the complexity of interfacing the sensor with other components has caused difficulty in packaging the system.

Problems have also been encountered in a system employing a pressure sensor; namely: 1.) the occurrence of rapid pressure changes occurring during the compressor clutch cycling which creates less temperature accuracy, whereas, the purpose of the freeze up prevention is to control temperature. There is a one-to-one relationship between the pressure value and the temperature value when the refrigeration system operates at steady-state condition. This one-to-one relationship does not exist when the refrigeration system operates in a dynamic mode; and, thus it is extremely difficult to control temperature based upon the pressure input; 2.) it is relatively costly, and, it has more parts and interfaces which makes packaging more difficult.

In the operation of the above described system, the cabin air temperature control is accomplished by controlling the refrigerant flow entering the evaporator through cycling the clutch of compressor. When the clutch is engaged, the compressor pumps refrigerant through evaporator which provides cooling to the blower air stream. When the compressor clutch is disengaged, the compressor stops and no refrigerant flows through evaporator. In actual vehicle operation, the cycling frequency ranges normally from 0 to about 6 cycles/min. The dynamic on/off cycling rate of the clutch has a substantial impact on the stability of cabin air temperature control. In this regard, the control algorithm developed should improve or optimize refrigerant system performance through balancing the needs of evaporator freeze up prevention and cabin air temperature quality (stability).

In order for the control algorithm fulfill its task providing accurate and optimum temperature control an accurate sensor must be provided and properly located. The control strategy and algorithm which will be used to control the clutch cycling operation based on the sensor signal are thus critical.

It has been thus desired to provide a sensor arrangement and algorithm for an automotive air conditioning system to operate the compressor clutch in accordance with a systematic control strategy that will maintain optimum compressor operation for preventing the formation of ice on the evaporator and yet provide the desired cooling and comfort level for a passenger compartment irrespective of the ambient conditions experienced during vehicle operation or the particular blower speed settings and air flow operation selected by the vehicle operator. It has further been desired to provide such a control sensor and algorithm integration for an automotive air conditioning system which is low in cost and easy to install during vehicle manufacturing.

BRIEF SUMMARY OF THE INVENTION

The present invention provides a refrigeration system utilizing temperature sensor preferably in the form of a transducer disposed to sense refrigerant temperature preferably at the evaporator outlet or alternatively at the evaporator inlet in a system employed for on-board vehicle refrigeration and particularly for a vehicle passenger compartment air conditioning system. The transducer provides an electrical signal to a controller which is programmed with an algorithm to provide disengagement of the refrigerant compressor clutch in time to prevent evaporator icing irrespective of ambient conditions, the selected blower motor speed or the air flow type of system operation insofar as the mix of the ambient and recirculated blower air flowing over the evaporator. The system is calibrated for a particular type or style of vehicle passenger compartment configuration with the range of available blower speeds and air flow mixture for a range of ambient conditions; and, an algorithm is developed which provides the desired cooling and prevent the formation of evaporator icing during actual vehicle operation.

The present invention thus provides an on-board vehicle refrigeration system, particularly suitable for vehicle passenger compartment air conditioning, which has the feedback temperature control signal derived from a sensor disposed to sense the refrigerant temperature at the evaporator inlet and which functions through an algorithm programmed into an electronic controller to maintain the required flow through the evaporator for effective cooling and to prevent evaporator icing. The system computes temperature set points for a given set of blower speed and air blend settings and cycles the compressor when the averaged temperature from the sensor is outside the set points.

DETAILED DESCRIPTION OF THE INVENTION

Figure 1:
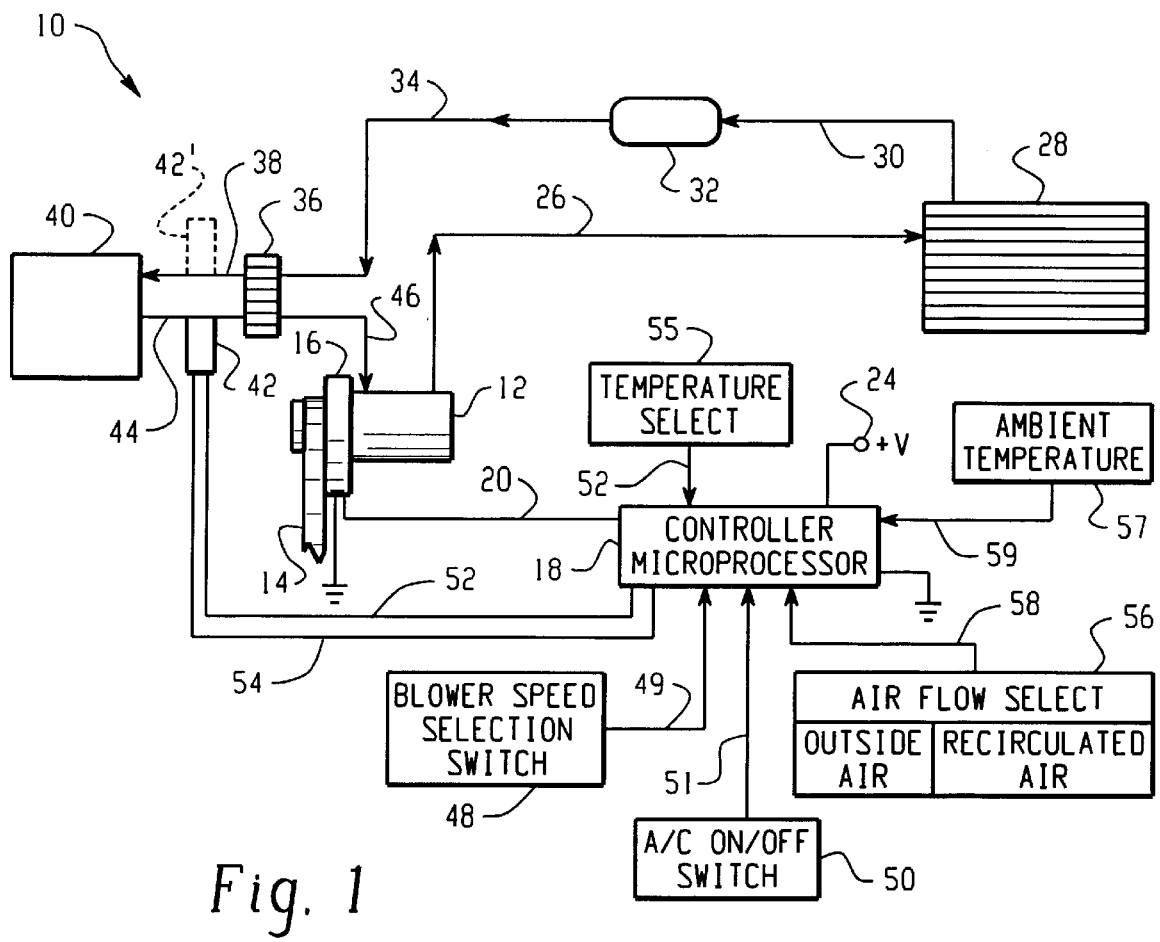
FIG. 1 is a schematic of an on-board vehicle refrigeration system.

Referring to FIG. 1, a typical on-board vehicle refrigerant system, such as employed for the vehicle passenger compartment air conditioning, is illustrated generally at 10 and includes compressor 12 driven by a power source such as an engine driven belt 14 which is connected to the compressor by an electrically operated clutch 16 connected to an electrical controller 18 along leads 20, 22. The controller is operated by an on-board vehicle electrical source 24.

The compressor discharges along line 26 which is connected to the inlet of an exothermic heat exchanger or condenser 28 which discharges along line 30 to a receiver/drier 32 which provides refrigerant flow along line 34 to the inlet of an expander 36 which, in the present practice of the invention, comprises a fluid capsule operated thermal expansion valve as is well known in the art of motor vehicle air conditioning systems. It will be understood however, the present invention may alternatively be employed in a system utilizing a capillary tube or other type expander 36 in place of a thermal expansion valve. The low pressure outlet of the expander 36 is applied along line 38 to the inlet of an endothermic heat exchanger or evaporator 40. A temperature sensor which may be in the form of a thermistor or temperature transducer 42 is preferably disposed in line 44 at the outlet of evaporator 40 for sensing the temperature of the refrigerant discharging from the evaporator. However, it will be understood that the sensor may alternatively be disposed in the inlet line 38 of evaporator 40, as shown in dashed outline in FIG. 1 and denoted by reference numeral 42'.

The evaporator discharges the superheated refrigerant along line 44 which is passed through the block of expander 36 for heat conduction purposes in a known manner and is returned to the compressor inlet along line 46.

The controller 18 receives inputs from the user operated blower speed select switch 48 along line 49 and also from the user operated A/C on/off switch 50 and from the temperature sensor 42 along leads 52, 54. The controller also receives an input along line 52 from a user temperature select input 55. The controller 18 also receives an input from the user operated outside air/recirculation mode select control 56 which provides an input along line 58 to the controller and an ambient temperature signal along line 59 from ambient temperature sensor 57.

Figure 2:
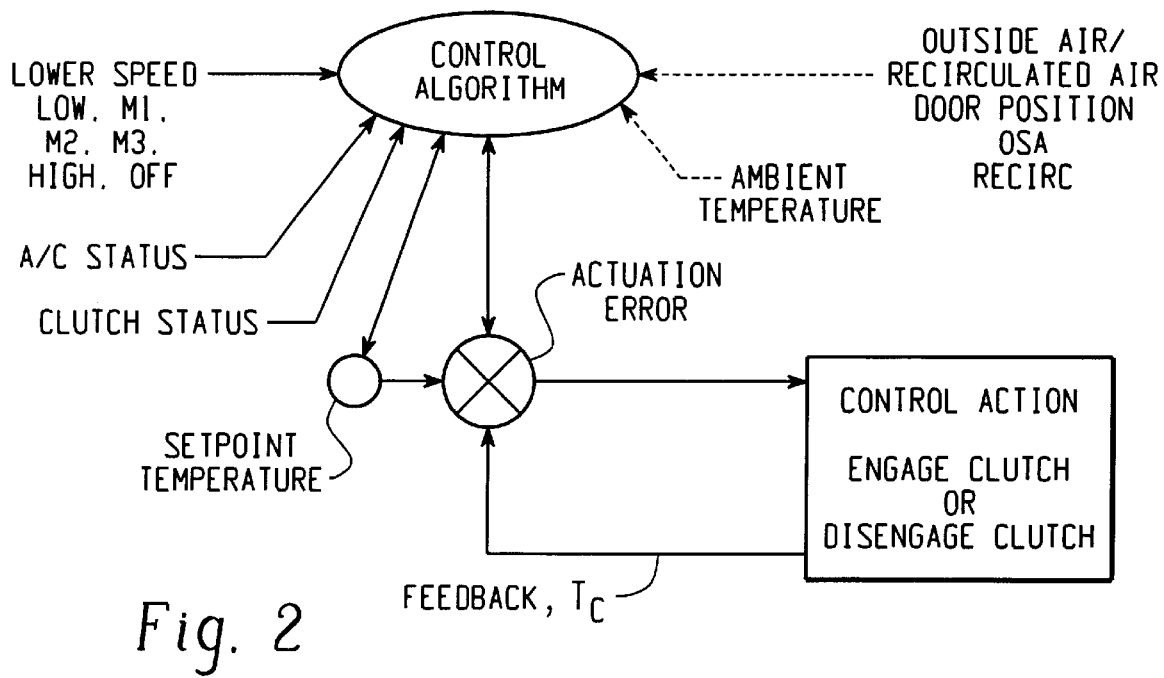
FIG. 2 is a block logic diagram for the controller of the system of FIG. 1.

Referring to FIG. 2, the general operation of the controller 18 is indicated wherein the refrigerant temperature input $T_C$ from the sensor 42 is operative to enable a set point temperature calculation hereinafter described with reference to FIGS. 4 and 5 which the controller utilizes to determine whether the compressor clutch should be engaged or disengaged.

Figure 3:
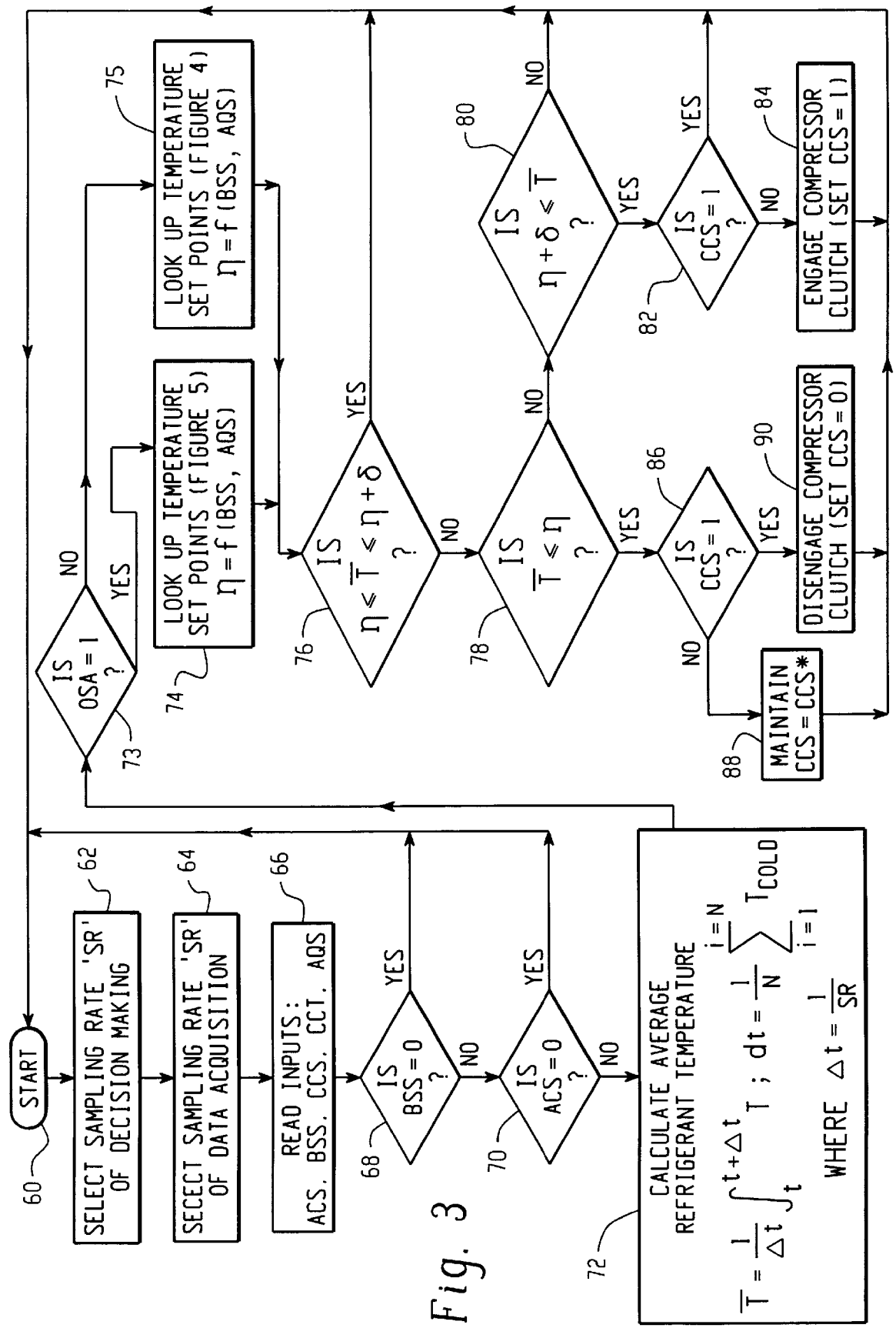
FIG. 3 is a flow diagram of the algorithm for the controller of the system of FIG. 1.

Referring to FIG. 3, the operation of the controller 18 is shown in a flow diagram wherein the system within the controller experiences initiation or Start at step 60 and moves to step 62 to select the sampling rate SR of the decision making and selects the sampling rate sr of data acquisition at step 64. The system then proceeds to read the inputs ACS, BSS, CCS, CCT, AQS at step 66 where ACS is the air conditioning selection, where zero represents OFF and one represents ON. BSS is the blower speed selection and has values low, M1, M2, M3, and high represented digitally by the integers 1 through 5. CCS is the compressor clutch status where zero represents the disengaged clutch and one represents the clutch engaged condition. CCS* represents the compressor clutch status at a previous sampling time. CCT is the cold control temperature as measured by the sensor or $T_c$. AQS is the air quality status and is represented by the air flow vane position having a state OSA equals one for outside air flow into the passenger compartment; and, OSA equals zero for air recirculation flow in the passenger compartment.

The system then proceeds to step 68 and asks the question whether BSS is zero; and, if the answer is affirmative returns to Start at step 60, but if the answer is negative the system proceeds to step 70 and asks the question whether ACS is zero. If the determination at step 70 is affirmative the system returns to Start at step 60; but, if the determination in step 70 is negative the system proceeds to step 72 and computes the average refrigerant temperature $\overline{T}$. It will be understood that in the calculations for $\overline{T}$ according to the expressions shown in step 72 of FIG. 3, "i" is equal to the number of samples taken at the rate of "sr" of step 64. The system then proceeds to step 73 and asks if air flow is outside or if OSA equals one. If affirmative the system proceeds to 74 and finds the temperature set points η from a look-up table of values of BSS and AQS from FIG. 5. If, however, the determination at step 74 is negative, the system proceeds to step 75 and determines the temperature set points η from a look-up table in accordance with FIG. 4. A simplified form of the lookup table is shown in Table I set forth below.

TABLE 1

| | | \multicolumn{5}{c}{BSS} | | | | |
|---|---|---|---|---|---|---|
| | | Low | M1 | M2 | M3 | High |
| Outside Air (OSA = 1) | Engage °F. (CCS = 1) | 42 | 40 | 38 | 36 | 34 |
| | Disengage °F. (CCS = 0) | 38 | 36 | 34 | 32 | 30 |
| Recirculation (OSA = 0) | Engage °F. (CCS = 1) | 44 | 42 | 40 | 38 | 36 |
| | Disengage °F. (CCS = 0) | 40 | 38 | 36 | 34 | 32 |

It will be understood that for each type vehicle, a table of set point values must be predetermined for programming of the controller 18.

The system having determined the temperature set points η at step 74 or step 75 proceeds to step 76 and asks the question whether the average temperature is equal to or greater than η or less than or equal to η plus an increment δ. If the determination at step 76 is affirmative the system returns to step 60; and, if the determination at step 76 is negative the system proceeds to step 78 and asks whether the average temperature $\overline{T}$ is equal to or less than the set point η. If the determination at step 78 is negative the system proceeds to step 80 and asks whether the average temperature $\overline{T}$ is equal to or greater than η plus δ and if not, the system returns to Start at step 60. If the determination at step 80 is affirmative the system proceeds to step 82 and asks whether CCS is equal to one, representing the compressor clutch engaged. If the determination at step 82 is affirmative, the system returns to Start at step 60; and, if negative the system proceeds to step 84 and engages the compressor clutch by setting CCS equal to one and returns to Start at step 60.

If the determination at step 78 is affirmative, the system proceeds to step 86 and inquires whether the compressor clutch status is equal to one, and if the determination is negative, the system proceeds to maintain the compressor clutch status at CCS* at step 88. However, if the determination at step 86 is affirmative the system proceeds to disengage the compressor clutch at step 90 by setting CCS equal to zero and returning to Start at step 60.

Figure 4:
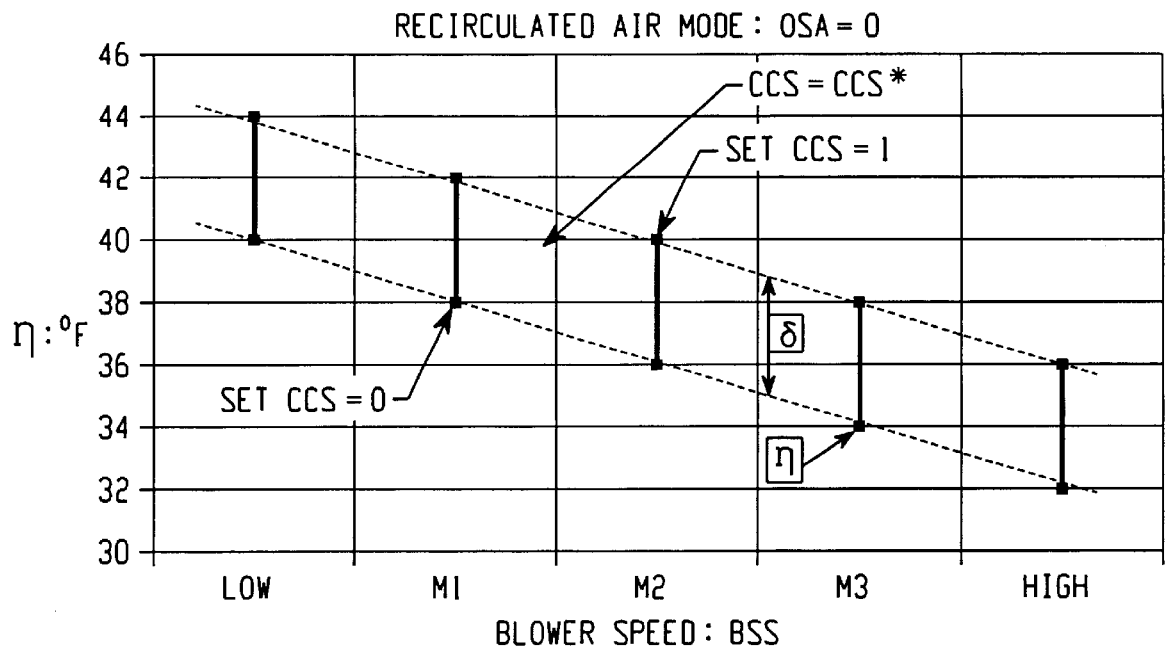
FIG. 4 is a graph of temperature set point as a function of the system blower speed for the system of FIG. 1 for recirculation mode of operation; and, FIG. 5 is a graph similar to FIG. 4 of temperature set point as a function of blower speed for outside air directed over the evaporator for the system of FIG. 1.
Figure 5:
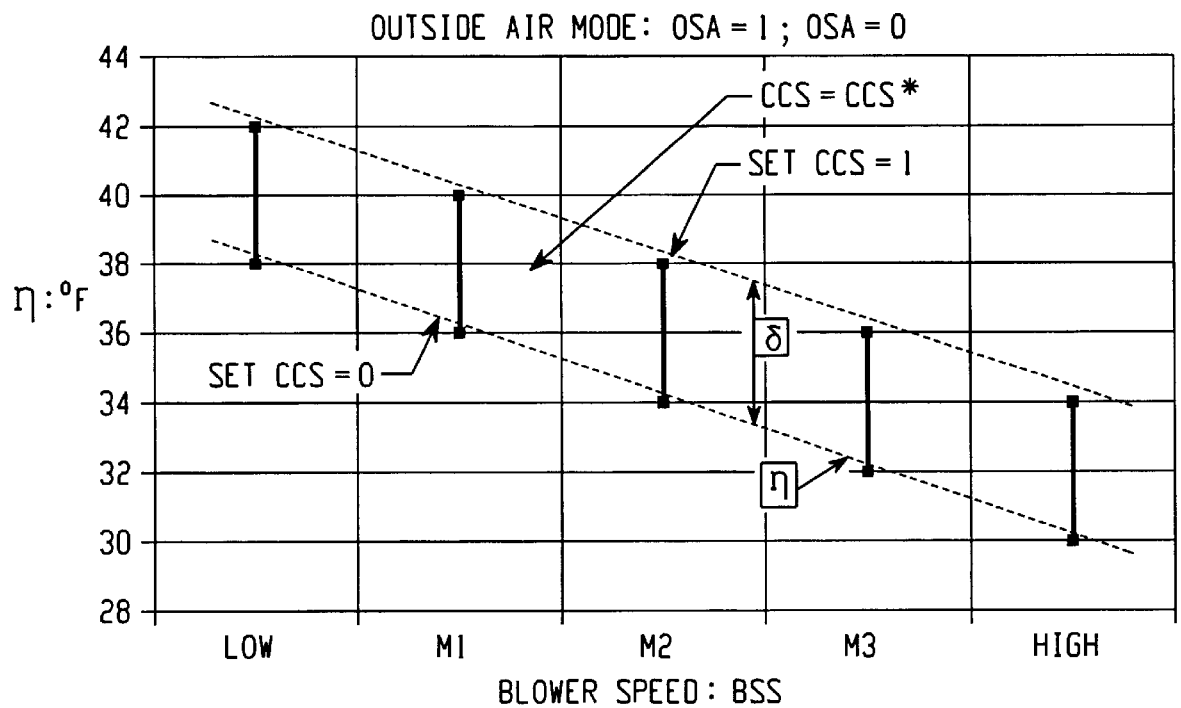

Referring to FIGS. 4 and 5, the temperature set points are plotted graphically as a function of blower speed for the conditions of recirculating air (OSA equals zero) and outside air (OSA equal to one or zero) for the system operating in accordance with the program of FIG. 3 and Table I. It will be observed from FIG. 4, that the value of δ has been set at 4° F. for OSA=0. FIG. 5 shows that for OSA=1, a value of 4° F. has been chosen for δ. It will be understood that decreasing δ increases compressor clutch cycling frequency and improves air temperature stabilization.

The present invention thus provides a technique for controlling the cycling of a compressor clutch for an automotive air conditioning system which minimizes the occurrence of evaporator freezing and the resultant long cycling of the compressor in an effort to provide cooling with the evaporator coated with ice. The present invention provides for optimizing the compressor clutch cycling from measurements of the temperature of the refrigerant discharging from the evaporator and calculating temperature set points based upon knowledge of the system from a lookup table based on user selected blower speed and air mode settings.

Although the invention has hereinabove been described with respect to the illustrated embodiments, it will be understood that the invention is capable of modification and variation and is limited only by the following claims.

What is claimed is:

1. A method of operating a refrigerant system of the type having a compressor energizeable for circulating refrigerant through an exothermic heat exchange (evaporator) for cooling a compartment and returning the refrigerant to the compressor, said method comprising:

(a) sensing the temperature ($T_S$) of the refrigerant at the evaporator and providing an electrical signal indicative thereof;

(b) sampling said signal at a selected interval of time;

(c) computing the average temperature (T) over said intervals from said sampled signals and from a table of values of T is a function of said signal;

(d) providing a flow of air selected from the mode consisting of (i) compartment air, (ii) ambient air external to the compartment and selecting the rate of air flow from a plurality of rates and directing said air flow in said selected mode at said selected rate over said endothermic heat exchanger to said compartment;

(e) determining a temperature set point (η) for said directed air from a table of set point as a function of values of air flow rate for the selected mode;

(f) comparing said average temperature ($\overline{T}$) with said set point and (i) energizing said compressor if $\overline{T}$ is less than said set point, (ii) de-energizing said compressor if $\overline{T}$ is greater than said set point η plus an assigned differential (δ), (iii) maintaining the status of said compressor where the average temperature $\overline{T}$ is equal to or intermediate said set point and said set point plus said assigned differential.

2. The method defined in claim 1, wherein said step of determining said set point includes assigning positive variant differential of about 4° F. to said set point.

3. The method defined in claim 1, wherein said step of selecting the rate of air flow includes selecting from at least four distinct incremented flow rates.

4. The method defined in claim 1, wherein said step of determining a temperature set point includes incrementing said set point about 2° F. for each incremental increase in said air flow rate.

5. The method defined in claim 1, wherein said step of sensing refrigerant temperature includes sensing the refrigerant temperature at a location from the group consisting of (i) the evaporator and (ii) the evaporator outlet.

* * * * *